Oct. 10, 1950     H. S. KAISER     2,525,224
DEHYDRATION OF LIQUIDS
Filed March 16, 1946
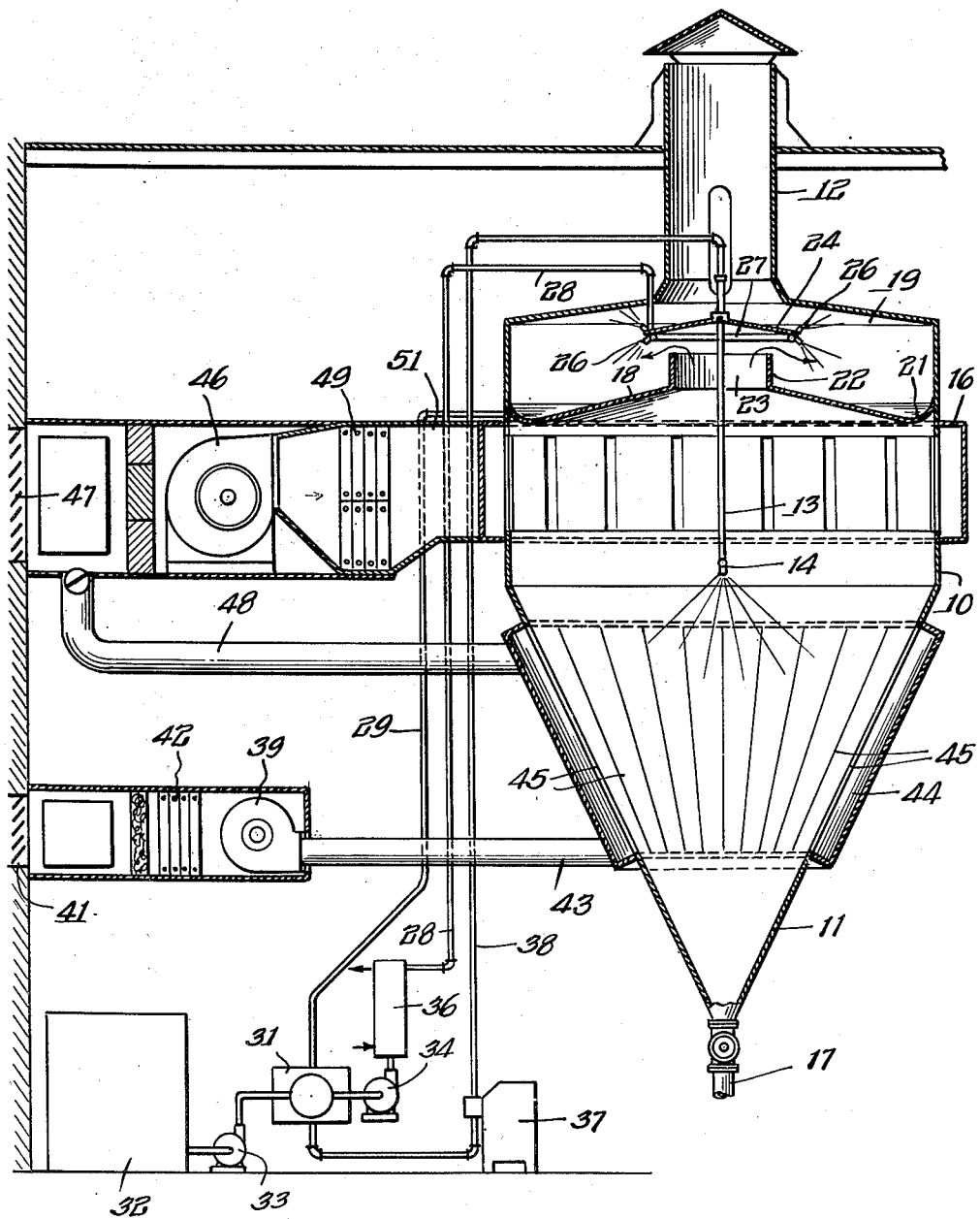
Inventor
Harry S. Kaiser
By: McLaughlin & Wallenstein
Attys.

Patented Oct. 10, 1950

2,525,224

UNITED STATES PATENT OFFICE 2,525,224

DEHYDRATION OF LIQUIDS

Harry S. Kaiser, Chicago, Ill., assignor to H. S. Kaiser Company, Chicago, Ill., a corporation of Illinois Application March 16, 1946, Serial No. 654,998

9 Claims. (Cl. 159—4)

My invention relates to desiccating apparatus.

In the art of desiccating materials dispersed or dissolved in water, after the manner popularly termed "spray drying," a relatively large amount of space and equipment is required to carry out the necessary steps of bringing the fluid material to be desiccated into contact with the heated air, to separate the dried particles from the air, to remove the dried material and to discharge the effluent moisture-laden air with a minimum heat content and with a minimum entrainment of dried particles. Processes and equipment, auxiliary to the drying equipment, have been employed for limiting loss of dried material, for preliminarily concentrating the liquid material to be desiccated, for conserving heat energy and the like, but, in general, while such processes and equipment have improved the overall desiccating procedure, they have added to the space and equipment required therefor.

One object of my invention is the provision of improved desiccating apparatus occupying relatively little floor space, and in which the amount of material used in constructing the apparatus is markedly reduced, this being brought about by the use of only a single chamber and a minimum of ductwork.

A further object is the provision of desiccating apparatus which is of simple construction, which is characterized by ready accessibility so that it may easily be kept clean, and which embodies means for conserving heat energy, thus limiting the entrainment of solid particles with effluent air and pre-concentrating the material treated in the apparatus.

Other specific objects and features of the invention will be apparent from a consideration of the detailed description taken with the accompanying drawing wherein the single figure is an elevational view, partly in section, of desiccating apparatus embodying the principles of my invention.

Referring now to the drawing, the apparatus comprises a drying chamber 10, the lower portion 11 of which is generally conical, the entire drying chamber being of circular cross section and having an upper outlet stack 12. Material to be dried is delivered through a pipe 13 to a centrally disposed spray nozzle 14 and heated air is discharged from a circling manifold 16 at a plurality of points circumferentially of the drying chamber in a manner known in the art. The heated air has a cyclonic action and in swirling moves downwardly and outwardly in contact with the spray from the nozzle 14 and upwardly at the center, the dried material being projected against the inner walls of the cone portion 11 and the greater part thereof falling out of suspension. The dried material is collected in a usual manner through a feed device 17. In the usual spray drier of this type, the effluent air rises in the center and is discharged, usually into a separating device where the last possible traces of dried material are removed therefrom.

In the apparatus of my invention, I provide a transverse partition 18 cutting off an upper portion of the drying chamber to form a shallow compartment 19. The partition 18 forms a trough 21, preferably annular as indicated, and has a shallow stack 22 surrounding a central opening 23 forming a communication between the shallow compartment 19 and the main portion of the drying chamber. A baffle 24 is disposed in the compartment 19 between the central opening 23 and the effluent air exhaust opening through the stack 12. This position of the baffle 24 defines a tortuous path through which the air must pass, and the relative shape of this tortuous path may be changed by vertical adjustment of the baffle 24. The baffle is shown as being supported from pipe 13, a suitable arrangement, but other support means may be employed.

Associated with the baffle 24 is at least one and, preferably, a plurality of spray nozzles 26 to which liquid material is delivered through a pipe 27 connected with a supply line 28. The liquid material delivered through the nozzles 26 is partially concentrated and falls to the trough 21 whence it is withdrawn through pipe 29 for delivery to a balance tank 31.

The drawing shows one simple manner of handling the liquid material, employing a storage tank 32 for the main body of liquid material to be dried and a balance tank 31 from which the liquid material is withdrawn for drying purposes. A pump 33 delivers the material from the storage tank 32 to the balance tank 31. A pump 34 withdraws material from the balance tank 31 and delivers it through a heater 36 to the pipe 28 for delivery to the spray nozzles 26. A relatively high pressure pump 37 also withdraws liquid material from the balance tank 31 and delivers it through supply line 38 to pipe 13.

The drawing also illustrates one simple manner of controlling the delivery of air to the drier in combination with a construction which overcomes the tendency of adherence of material on the side walls of the drying chamber when hygroscopic products such as molasses, sugar syrups, malt syrup and the like are being dried.

To this end, a blower 39 draws air from an intake 41 through a controlled cooling unit 42, which may also comprise or include a dehumidifying unit, and delivers it through a duct 43 to a jacket 44 surrounding or encompassing the major area of the cone 11. The air is delivered into the drying chamber tangentially (in the same direction as the direction of movement as what may be characterized as the primary air which spirals down from the cylindrical portion of the drier and which is introduced through the duct 51, as hereafter described) through a series of elongated slotted openings 45 and sweeps along the inner walls of the cone, thereby overcoming the tendency of hygroscopic materials to adhere to the walls. The drying air is withdrawn by a blower 46 from an intake 47 and also from a duct 48 connected to the jacket 44. Thus, in this construction, the outside air is first mixed with the air from the jacket 44, which latter air has picked up a considerable portion of heat from the drying chamber. The air from the blower 46 is delivered through a controlled heating unit 49 and then through a large duct 51, communicating with the manifold 16, previously referred to, for delivery to the drying chamber. The elongated slotted openings 45 may, if desired, be provided with means for closing the same. In such event, of course, the air which is introduced into the jacket 44 and may be preliminarily cooled to a predetermined degree does not enter the drying chamber proper but serves to cool the side walls of the drying chamber from which it passes through the duct 48 into the main air intake, the construction serving, in effect, as a heat economizer.

The air control-equipment may be of any conventional type capable of delivering to the drying chamber a suitable quantity of heated air at the proper pressure and temperature to perform the drying operations. The jacket 44 and associated apparatus may be eliminated entirely, when non-hygroscopic types of materials are to be dried, and in that case all of the air for the blower 46 may be taken from the intake 47. Any suitable process and/or equipment may be employed for preheating such air, using for the purpose, if desired, any means for taking advantage of exhaust heat energy in ways suggested in the art. My invention, in other words, is not concerned primarily with air control except in so far as it may have a bearing upon the operation of the apparatus embodied in the drying chamber.

The exact manner of proportioning and operating that portion of the equipment housed above the transverse partition 18 is determined in part at least by the liquid material treated. While all of the liquid material delivered through the spray 14 may initially be concentrated by delivery through the spray nozzles 26, in which case a separate tank may be employed for receiving the concentrate and from which the concentrate will be withdrawn for delivery to the high pressure spray nozzle 14, only a portion of the liquid may be so treated and a common balance tank 31 may be employed in the manner shown.

The apparatus of my present invention operates in the manner of a conventional "spray drier," the dried material being withdrawn from the bottom of the cone and moisture-laden air delivered through the stack 12. In its passage through the shallow upper compartment 19, the air comes in contact with the spray from nozzles 26 and a portion of the residual heat is withdrawn therefrom and such particles as may be still entrained therein are removed by the action of the spray and the liquid falling to trough 21 is thereby partially concentrated. The effluent air has given up some of its residual heat, thereby increasing the efficiency and lowering the cost of the drying operation and the use of additional apparatus for further separating entrained solid particles is made unnecessary. Thus, the entire operation is carried on in a single piece of equipment with greater efficiency, lower cost, with less floor space and with less initial investment for upkeep due to the greatly decreased amount of materials and equipment required.

What I claim as new and desire to protect by Letters Patent of the United States is:

1. In desiccating apparatus of the character described which comprises a chamber including a lower inverted cone, means for spraying liquid centrally of said chamber, means for introducing heated air tangentially of said chamber to cause a swirling action and centrally rising air column, said chamber having an upper central air exhaust port, the improvement which comprises a transverse partition across an upper portion of the chamber, said partition having a central opening and outer trough, a baffle between said central opening in the partition and exhaust port in the chamber defining a tortuous passage for effluent air, and means for spraying liquid to be desiccated into said tortuous passage.

2. In desiccating apparatus of the character described which comprises a chamber, means for spraying liquid into said chamber, means for delivering heated air into contact with said spray, said chamber having an upper air outlet, the improvement which comprises an upper transverse partition forming a shallow upper compartment and having an opening for admission of air from said chamber, means defining a tortuous air path in said shallow upper compartment between said opening and air outlet, means for spraying liquid material to be dried in said tortuous path, and means for collecting said liquid material for delivery to said first mentioned spray means.

3. In desiccating apparatus of the character described which comprises a chamber including a lower inverted cone, means for spraying liquid centrally of said chamber, means for introducing heated air tangentially of said chamber to cause a swirling action and centrally rising air column, said chamber having an upper air exhaust port, the improvement which comprises a transverse partition across an upper portion of the chamber, said partition having a central opening therein, a baffle between said central opening in the partition and air exhaust port in the chamber defining a tortuous passage for effluent air, means for spraying liquid to be desiccated into said tortuous passage, and means for collecting the resulting partly concentrated liquid.

4. In desiccating apparatus of the character described which comprises a chamber including a lower inverted cone, means for spraying liquid centrally of said chamber, means for introducing heated air tangentially of said chamber to cause a swirling action and centrally rising air column, said chamber having a central air exhaust port, the improvement which comprises a transverse partition across an upper portion of the chamber, said partition having a central opening and outer trough, means defining a tortuous air passage between said central opening in the partition and exhaust port in the chamber and means for spraying liquid to be desiccated into said tortuous passage.

5. In desiccating apparatus of the character described which comprises a chamber including a lower inverted cone, means for spraying liquid centrally of said chamber, means for introducing heated air tangentially of said chamber to cause a swirling action and centrally rising air column, said chamber having a central air exhaust port, the improvement which comprises a transverse partition across an upper portion of the chamber, said partition having a central opening, means forming a tortuous air passage between said central opening in the partition and exhaust port in the chamber, means for spraying liquid to be desiccated into said tortuous passage, and means for collecting the resulting partly concentrated liquid.

6. In desiccating apparatus of the character described which comprises a chamber the lower part of which has the shape of an inverted cone, means for spraying liquid centrally of said chamber, means for introducing heated air tangentially of said chamber to cause a swirling action and centrally rising column, said chamber having a central air exhaust port, the improvement which comprises means forming a shallow compartment communicating with said chamber through a central opening, a baffle between said central opening in the shallow compartment and exhaust port in the chamber defining a tortuous passage for effluent air, means for spraying liquid to be desiccated into said tortuous passage, and means for collecting, in said shallow compartment, the resulting partially concentrated liquid.

7. In desiccating apparatus of the character described which comprises a chamber the lower part of which has the shape of an inverted cone, means for spraying liquid centrally of said chamber, means for introducing heated air tangentially of said chamber to cause a swirling action and centrally rising column, said chamber having a central air exhaust port, the improvement which comprises means forming a shallow compartment communicating with said chamber through a central opening, means forming a tortuous passage between said central opening and exhaust port, means for spraying liquid to be desiccated into said tortuous passage, and means for collecting, in said shallow compartment, the resulting partially concentrated liquid.

8. In desiccating apparatus of the character described which comprises a chamber including a lower inverted cone, means for spraying liquid centrally of said chamber, means for introducing heated air tangentially of said chamber to cause a swirling action and centrally rising air column, said chamber having an upper central air exhaust port, the improvement which comprises a transverse partition across an upper portion of the chamber, said partition having a central opening and outer trough, a baffle between said central opening in the partition and exhaust port in the chamber defining a tortuous passage for effluent air, and spray nozzles adjacent the baffle and delivering liquid to be desiccated into said tortuous passage.

9. In desiccating apparatus of the character described which comprises a chamber including a lower inverted cone, means for spraying liquid centrally of said chamber, means for introducing heated air tangentially of said chamber to cause a swirling action and centrally rising air column, said chamber having an upper central air exhaust port, the improvement which comprises a transverse partition across an upper portion of the chamber, said partition having a central opening and outer trough, a baffle between said central opening in the partition and exhaust port in the chamber defining a tortuous passage for effluent air, said baffle being vertically adjustable between said central opening and upper air exhaust port, and spray nozzles adjacent the baffle for delivering liquid to be desiccated into said tortuous passage.

HARRY S. KAISER.

REFERENCES CITED

The following references are of record in the file of this patent:

UNITED STATES PATENTS

| Number | Name | Date |
|---|---|---|
| 564,481 | Gaiennie | July 21, 1896 |
| 1,157,935 | Gray | Oct. 26, 1915 |
| 1,491,486 | Marquard et al. | Apr. 22, 1924 |
| 1,591,583 | Vila | July 6, 1926 |
| 1,829,477 | Douthitt | Oct. 27, 1931 |
| 1,888,872 | Yarmet | Nov. 22, 1932 |
| 1,905,263 | Burner | Apr. 25, 1933 |
| 1,933,254 | Goodell | Oct. 31, 1933 |
| 1,943,146 | Rust | Jan. 9, 1934 |
| 1,989,406 | Doolittle | Jan. 29, 1935 |
| 2,154,000 | Zizinnia | Apr. 11, 1939 |
| 2,314,159 | Peebles | Mar. 16, 1943 |
| 2,461,584 | Andersen et al. | Feb. 15, 1949 |